US007107265B1

(12) United States Patent
Calvignac et al.

(10) Patent No.: US 7,107,265 B1
(45) Date of Patent: Sep. 12, 2006

(54) SOFTWARE MANAGEMENT TREE IMPLEMENTATION FOR A NETWORK PROCESSOR

(75) Inventors: Jean Louis Calvignac, Cary, NC (US); Marco C. Heddes, Raleigh, NC (US); Clark Debs Jeffries, Durham, NC (US); Piyush Chunilal Patel, Cary, NC (US); Mark Anthony Rinaldi, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/545,100

(22) Filed: Apr. 6, 2000

(51) Int. Cl.
 *G06F 17/30* (2006.01)
 *G06F 15/00* (2006.01)
 *G06F 9/44* (2006.01)
(52) U.S. Cl. .................. 707/6; 707/3; 707/7; 715/514; 717/143
(58) Field of Classification Search ................ 707/1–4, 707/6–7, 100, 205; 709/213–216
See application file for complete search history.

(56) References Cited

U.S. PATENT DOCUMENTS

| 5,857,196 | A | 1/1999 | Angle et al. |
| 5,946,679 | A | 8/1999 | Ahuja et al. |
| 2002/0099855 | A1* | 7/2002 | Bass et al. ................... 709/249 |
| 2003/0093613 | A1* | 5/2003 | Sherman ...................... 711/104 |

FOREIGN PATENT DOCUMENTS

| JP | 02-260334 | 10/1990 |
| JP | 05-167640 | 7/1993 |
| JP | 10-162013 | 6/1998 |
| JP | 10-257066 | 9/1998 |
| JP | 2001-357071 | 12/2001 |
| WO | 96/00945 | 1/1996 |

OTHER PUBLICATIONS

"Address Resolution for IP Routing", Kenshin Yamada et al., Technical Report of the IEICE, SSE98-72, IN98-53(2), CS98-69(Sep. 1998), pp. 1-6.
"Study on Efficient Cache Structures Providing Policy-Based Servies in IP Routers", Shingo Ata et al., Technical Report of the IEICE, CS99-155, CQ99-78(Feb. 2002), pp. 43-48.
Abstract of Masami Shishibori, et al., "Improvement of Binary Digital Search (BDS)—Tree Using Hierarchical Structures", The Institute of Electronics, Information and Communication Engineers, Information and Communication Engineers, D-I, vol. J79-D-I, No. 2, Feb. 1996, pp. 79-87 (Abstract in English).

* cited by examiner

*Primary Examiner*—Alford W. Kindred
(74) *Attorney, Agent, or Firm*—Joscelyn G. Cockburn; Dillon & Yodell, LLP

(57) ABSTRACT

Novel data structures, methods and apparatus for a Software Managed Tree (SMT) which provides a mechanism to create tree structures that follow a search mechanism defined by a control point processor. The search mechanism does not require storage on the previous pointer and uses only a forward pointer along with a next bit or group of bits to test thereby reducing storage space for nodes. The search mechanism processes multiple filter rules for an application without requiring multiple searches and also allows various filter rules to be chained. Two patterns of the same length are stored in each leaf to define a range compare. A compare at the end operation is either a compare under range or a compare under mask. In a compare under range, the input key is checked to determine if it is in the range defined by the two patterns. In a compare under mask, the bits in the input key are compared with the bits in a first leaf pattern under a mask specified in a second leaf pattern.

48 Claims, 13 Drawing Sheets

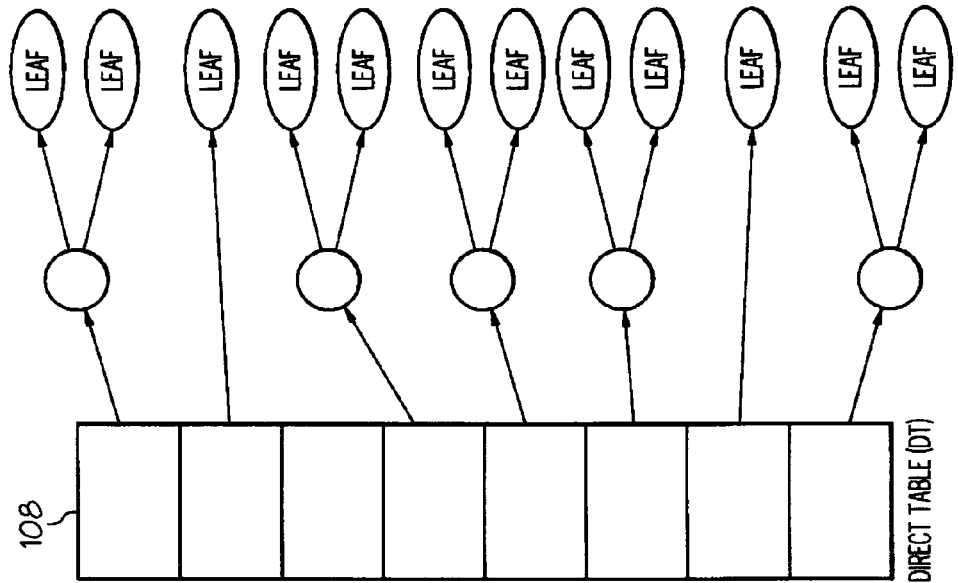
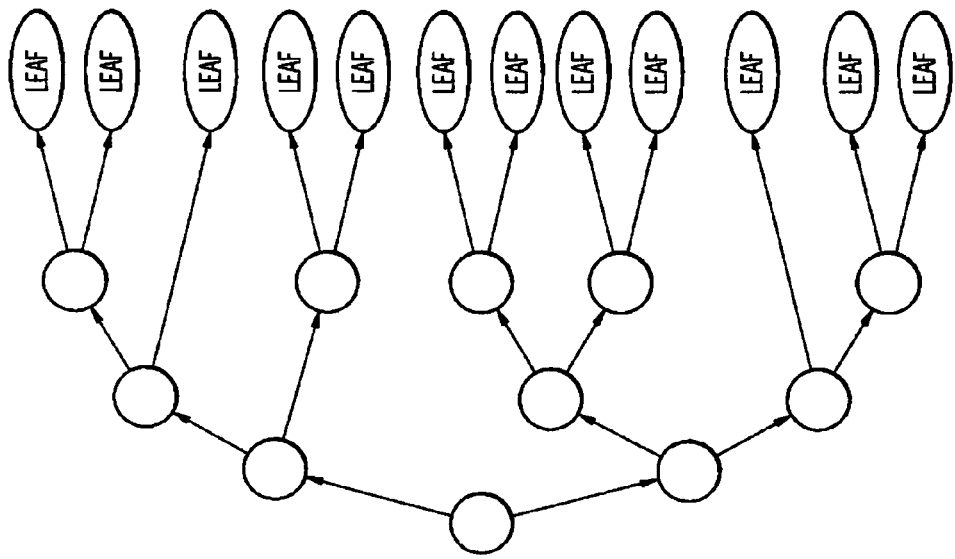
FIG. 6

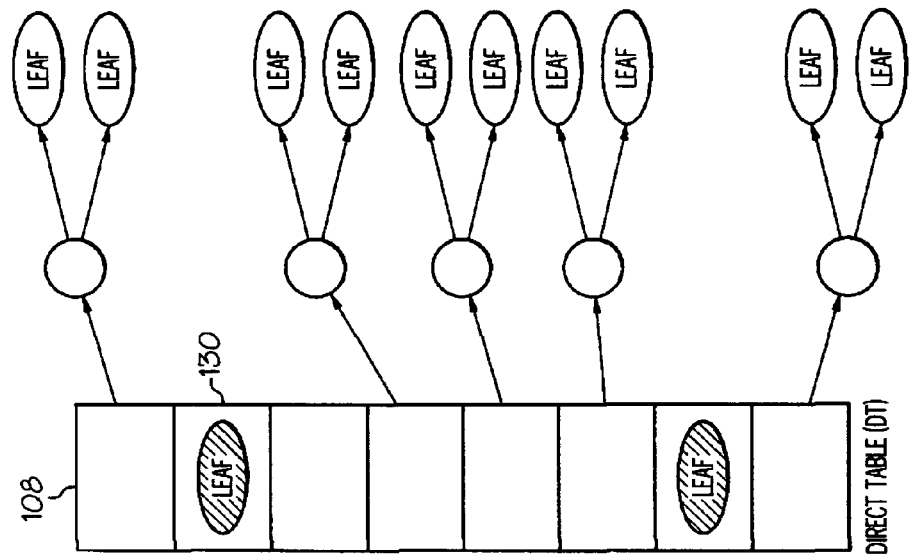
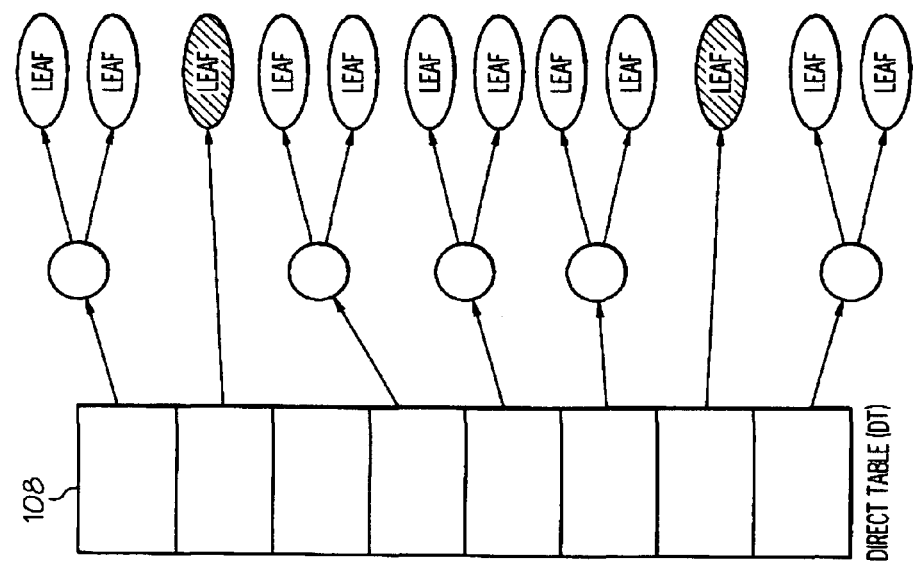
FIG. 7

| INPUT KEY | IPSA (32bits) | IPDA (32 bits) | SrcPort (16 bits) | DstPort (16 bits) | Prot (8b) |
|---|---|---|---|---|---|
| LEAF-PATTERN 0 | VALUE | VALUE | MIN | MIN | VALUE |
| LEAF-PATTERN 1 | MASK | MASK | MAX | MAX | MASK |

FIG. 8

| RANGE 1 | | RANGE 2 | | | |
|---|---|---|---|---|---|
| OFFSET FIELD 0 8bit | MINMAX LENGTH FIELD 0 8b | OFFSET FIELD 1 8bit | MINMAX LENGTH FIELD 1 8b | ONE/TWO RANGES 1 bit | CONTINUE 1 bit |
| | | | | 0: RANGE1 VALID 1: RANGE1 AND 2 VALID | 0: STOP AT THIS COMPARE 1: CONTINUE WITH NEXT COMPARE |

FIG. 9

LUDefTable TREE DEFINITION

| FIELD | SIZE | Bits |
|---|---|---|
| CacheEntry | 1 | 0 |
| Tree_Type | 2 | 2..1 |
| hash-type | 4 | 6..3 |
| color_en | 1 | 7 |
| P1P2_max_size | 5 | 12..8 |
| NPARope_en | 1 | 13 |
| NPASMT_en | 1 | 14 |
| CompIndex_en | 1 | 15 |
| PSCB_fq_index | 6 | 21..16 |
| PSCW_Height | 1 | 22 |
| Mask_Vector_En | 1 | 23 |
| CompIndex | 8 | 31..24 |
| DT_base_addr | 26 | 57..32 |
| DT_size | 4 | 61..58 |
| DT_interleaf | 2 | 63..62 |
| Leaf_fq_index | 6 | 69..64 |
| Leaf_Width | 2 | 71..70 |
| Leaf_height | 3 | 74..72 |
| DirectLeafEn | 1 | 75 |

FIG. 11

| FIELD | SIZE | ADDRESS IN TSM WHERE PSCB IS LOCATED |
|---|---|---|
| NPA0 | 26 | NEXT PSCB ADDRESS: POINTER TO NEXT PSCB IN THE TREE FOR 0-PART OF PSCB |
| NBT0 | 8 | NEXT BIT TO TEST FOR 0-PART OF PSCB |
| LCBA0 | 26 | LEAF CONTROL BLOCK ADDRESS: POINTER TO LEAF FOR 0-PART OF PSCB |
| NPA1 | 26 | NEXT PSCB ADDRESS: POINTER TO NEXT PSCB IN THE TREE FOR 1-PART OF PSCB |
| NBT1 | 8 | NEXT BIT TO TEST FOR 1-PART OF PSCB |
| LCBA1 | 26 | LEAF CONTROL BLOCK ADDRESS: POINTER TO LEAF FOR 1-PART OF PSCB |
| Index | 8 | INDEX OF THIS PSCB (PHYSICALLY STORED IN THE PREVIOUS PSCB) |
| PatBit | 1 | THE VALUE OF HASHEDKEY[INDEX], BASED ON THE VALUE OF THE INDEX FIELD IN THE PSCB REGISTER |

FIG. 12

| FIELD NAME | LENGTH | DESCRIPTION |
|---|---|---|
| NLASMT | 4 BYTES | LEAF CHAINING POINTER TO CHAIN LEAVES FOR SMT; INCLUDES THE SHAPE OF THE CHAINED LEAF |
| COMP_TABLE_INDEX | 1 BYTE | DEFINES THE INDEX IN THE CompDefTable THAT DEFINES THE COMPARE BETWEEN PATTERN1, PATTERN2 AND THE HashedKey |
| PATTERN1 AND PATTERN2 | 4-36 BYTES | THIS FIELD CONTAINS PATTERN1 AND PATTERN2, BITWISE INTERLEAVED; THAT IS, BIT 0 OF THE FIELD CONTAINS BIT 0 OF PATTERN1, BIT 1 CONTAINS BIT 0 OF PATTERN2; ALTERNATELY, THE EVEN BITS REPRESENT PATTERN1 AND THE ODD BITS REPRESENT PATTERN2 |
| USERDATA | VARIABLE | THE CONTENTS OF THIS FIELD IS UNDER COMPLETE PICOCODE CONTROL; THE UserData FIELD CAN INCLUDE ONE OR MORE COUNTERS |

FIG. 13

SOFTWARE MANAGEMENT TREE IMPLEMENTATION FOR A NETWORK PROCESSOR

CROSS-RELATED REFERENCE TO RELATED APPLICATIONS

This application is related to, and contains common disclosure with, co-pending and commonly assigned patent applications "Network Processor Processing Complex and Methods", Ser. No. 09/384,691, filed Aug. 27, 1999; "Full Match (FM) Search Algorithm Implementation for a Network Processor", Ser. No. 10/650,327; and "Longest Prefix Match (LPM) Algorithm Implementation for a Network Processor", Ser. No. 11/045,634. Each co-pending patent application is hereby incorporated by reference into this description as fully as if here represented in full.

BACKGROUND OF THE INVENTION

The present invention relates generally to pattern matching algorithms and, more particularly, to a software management tree search algorithm that can be implemented in a network processing device.

The demand for hardware-integrated processing to support more and more complex tasks at media speed has led to the creation of network processors. Network processors provide wirespeed frame processing and forwarding capability with function flexibility through a set of embedded, programmable protocol processors and complementary system coprocessors. Network processors are expected to become the fundamental network building block for networks in the manner that microprocessors are for today's personal computers. Network processors offer real-time processing of multiple data streams, providing enhanced security and IP packet handling and forwarding capabilities. In addition, they provide speed improvements through advanced architectures, such as parallel distributed processing and pipeline processing designs. These capabilities can enable efficient search engines, increased data handling throughput, and provide rapid execution of complex tasks. The programmable features of network processors provide network product developers an easier migration path to implement new protocols and technologies without requiring new custom Application Specific Integrated Circuit (ASIC) designs.

Network processors provide a highly customizable, scalable technology for the development of interconnect solutions for Internet or enterprise network providers. A network processor provides the basis for a wide range of solutions from a low-end, stand-alone device to a large multirack solution. Scaling of this nature is accomplished through the use of high performance, non-blocking packet routing switch technology and proprietary interfaces such as IBM Corporation's Data Aligned Serial Link (DASL) interface which can be adapted to other industry switch technologies.

As a programmable communications integrated circuit, the network processor provides very efficient packet classification, multi-table lookups per frame, packet modification, queue/policy management, and other packet processing capabilities. The network processor integrates a switching engine, search engine, frame processors and Ethernet MACs on one device to support the needs of customers who require high capacity, media weight switching frames based on frame content at any protocol layer.

Hardware accelerators perform frame forwarding, frame filtering and frame alteration. The network processor's ability to enforce hundreds of rules with complex range and action specifications sets a new benchmark for filtering capabilities, making a network processor-based system uniquely suited for high capacity server farm applications.

A typical system developed with a network processor uses a distributed software model, with each programmable network processor executing tasks concurrently. Some functions are performed in the control point (CP) processor, which can be internal or external to the network processor. The CP provides support for layer 2 and layer 3 routing protocols, and layer 4 and layer 5 network applications and systems management. Wirespeed forwarding and filtering functions are performed by a combination of the network processor hardware and resident picocode.

In communication networks, comprising a number of interconnected nodes, data can be sent from one node to any other node or network. Specialized nodes called routers are responsible for forwarding the data to their destinations. Any data sent through a communication network contains information about the destination address, generally as part of a header. Each router compares this information, or at least part of it, with a list of addresses stored internally. If a match is found between stored addresses and the destination address, the router establishes a path leading to the destination node. Depending on the network size and structure, the data are either directly forwarded to their destination or sent to another intermediate router. The International Organization for Standardization (ISO) promulgated a routing standard in which a router stores routing information for partial addresses. The router then sends the packet to the best matching partial address it has in its database. The ISO standard allows a hierarchal structure of nodes to be built using a given number of digits or a given header length. Main routers are addressed by the initial part of the address, subrouters by the middle part, and the final destination by the last digits of the address. Therefore, it is sufficient for any router to read the digits assigned to the level of the hierarchy to which the data are to be sent.

The routing of the receive packet is based on the accompanying address string. The address string is used as a search key in a database which contains the address string along with other pertinent details such as which router is next in a delivery of a packet. The database is referred to as a routing table, while the link between the current router and the next router is called the next hop in the progress of the packet. The routing table search process depends on the structure of the address as well as the organization of the tables. For example, a search key of a size less than 8 bits and having a nonhierarchal structure would most efficiently be found in a routing table organized as a series of address entries. The search key would be used as an index in the table to locate the right entry. For a search key of a larger size, say thirty-two bits, the corresponding routing table may have more than 10,000 entries. Organizing the database as a simple table to be searched directly by an index would waste a large amount of memory space, because most of the table would be empty.

Conventional routers break up the search process into several steps. The first step is to determine whether the router is directly connected to the destination host computer. In this case, the message is one hop from the destination and should be routed in that direction. If the destination computer is not directly connected to the router, the next step is to determine the topological direction of the destination network. If the direction is determined from the topological layout, the message is routed that way. Otherwise, the final step is to route the message along a default link.

Typically, the first step is performed using a linear search through a table containing the thirty-two bit addresses of host computers directly connected to the router. Reflecting the local topology, each entry in the address table is connected to a corresponding output interface leading directly to the addressed computer. When a destination address is received by a router, the full thirty-two bits are compared with each of the destination addresses in a table. If a match is found, the message is sent directly to the corresponding destination via the specified router interface.

The second step, that of determining the direction of the destination network, is not usually performed by a linear search through a table since the number of network addresses would make such a table difficult to manage and use. In the prior art, when address strings conformed to the three-level hierarchy of network address, subnet address and host identification, routers performed the determination using one of several well-known techniques, such as hashing, Patricia-tree searching, and multilevel searching. In hashing, a hash function reduces the network portion of the address, producing a small, manageable index. The hash index is used to index a hash table and to search for a matching hash entry. Corresponding to each hash entry of the hash table is the address of an output interface pointing in the topological direction of a corresponding network. If a match is found between the hash network portion and a hash entry, the message is directed towards the corresponding interface and destination network.

Hashing reduces a large, unmanageable field to a small manageable index. In the process, however, there is a chance that two or more fields may generate the same hash index. This occurrence is referred to as a collision, since these fields must be stored in the same location in the hash table. Further searching is needed to differentiate the entries during a collision. Therefore, collisions reduce the efficiency obtained from using the hashing search, and in the worst case, where all permissible addresses reduce to a single index, hashing is rendered practically useless as a search process.

Patricia-tree searching avoids the collisions encountered by hashing methods. This method of searching requires that all address strings and accompanying information, such as related route information, be stored in a binary tree. Starting from the most significant bit position within the address string, the search process compares the address, bit by bit, with the tree nodes. A matched bit value guides the search to visit either the left or the right child node and the process is repeated for the next bit of the address. The search time is proportional to the size of the longest address string stored. In Patricia-tree searching, the difference between the average search time and the worst case search time is not very large. In addition, the routing table is organized quite efficiently. It requires less memory than comparable routing tables of hashing methods. Patricia-tree searching handles the worst case searches better than the hashing methods, but in most cases it takes significantly longer to locate a match. Therefore, many conventional routers use a combination of hashing and Patricia-tree searching. This combination is called multilevel searching.

Multilevel searching joins hashing with Patricia-tree searching. A cache stores a hash table containing a subset of the most recently, and presumably most commonly, routed network addresses, while a Patricia-tree stores the full set of network addresses. As the message is received, the destination address is hashed onto the table. If it is not located within a pre-determined period of time, the address is passed to the Patricia-tree search engine which insures that the address, if stored, will be found.

In the prior art, there are a number of known tree search algorithms including fixed match trees, longest prefix match trees and software managed trees. Fixed match trees are used for fixed size patterns requiring an exact match, such as layer 2 Ethernet MAC tables. Longest prefix match trees are used for variable length patterns requiring only partial matches, such as IP subnet forwarding. Software managed trees are used for patterns that are defined as ranges or bit masks, such as filter rules. In general, lookup is performed with the aid of a tree search engine (TSE).

SUMMARY OF THE INVENTION

One object of the invention is to provide a unique and efficient mechanism to process multiple filter rules for an application without requiring multiple searches.

Another object of the invention is to provide a search mechanism that does not require storage on the previous pointer and uses only a forward pointer along with a next bit or group of bits to test thereby reducing storage space for nodes.

This invention describes a novel data structure for a Software Managed Tree (SMT) which provides a mechanism to create tree structures that follow a search mechanism defined by a control point. An exemplary mechanism of this would be an Internet Protocol (IP) 5-tuple filtering table, containing IP source address (IPSA), IP destination address (IPDA), source port (SP), destination port (DP) and communications protocol. In contrast to Full Match or Longest Prefix Match trees, SMT trees allow support for range compares. For example, a leaf can be used to specify that the source port must be in the range x and y. This approach allows a very efficient and simple implementation with efficient storage and search time. This approach also allows various filter rules to be chained.

BRIEF DESCRIPTION OF THE DRAWINGS

The invention is better understood by reading the following detailed description of the preferred embodiment in conjunction with the accompanying drawings, wherein:

FIG. 6 illustrates the effect on exemplary data structures of using a direct table in accordance with a preferred embodiment of the invention.

FIG. 7 illustrates the effect on exemplary data structures of having direct leaves enabled in accordance with a preferred embodiment of the present invention.

FIG. 8 illustrates examples of fields in the input key and leaf patterns for a Software Managed Tree (SMT) in accordance with a preferred embodiment of the present invention.

FIG. 9 illustrates an exemplary format for a compare definition table entry in accordance with a preferred embodiment of the present invention.

FIG. 11 illustrates the internal structure of an exemplary lookup definition table in accordance with a preferred embodiment of the present invention.

FIG. 12 illustrates the internal format of a PSCB register.

FIG. 13 illustrates the fixed leaf format for SMT Trees.

DETAILED DESCRIPTION OF THE PREFERRED EMBODIMENT

Figure 1:
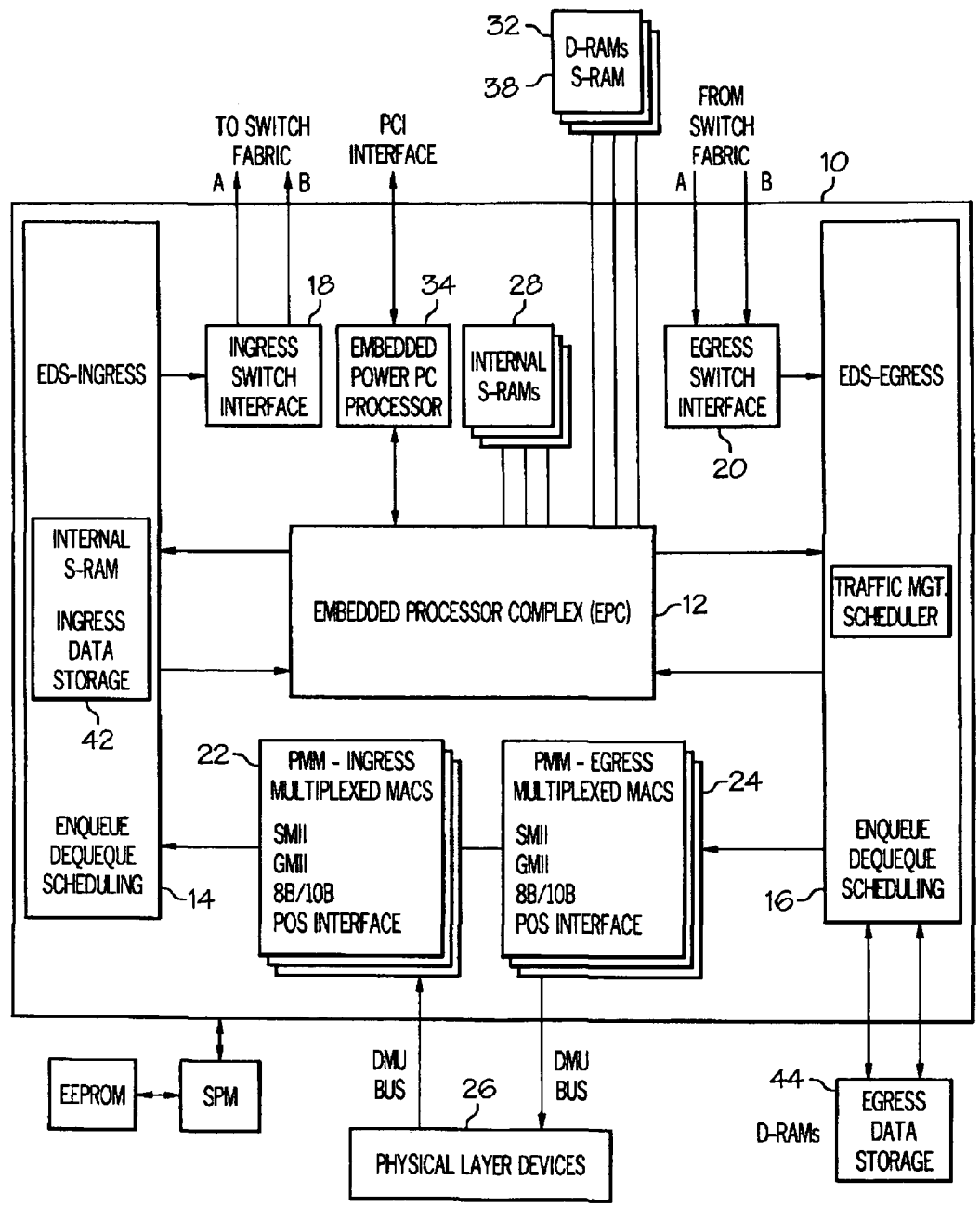
FIG. 1 illustrates an exemplary architecture for a network processor in accordance with a preferred embodiment of the present invention.

The present invention will be described in the context of a network processor in which the invention is embedded. The network processor 10 is a programmable switching and routing system on a single chip, an architecture of which is depicted in FIG. 1. It provides media interfaces for 10/100 Ethernet, Gigabit Ethernet and Packet Over SONET (POS) as well as data aligned serial links (DASL) for attachment to switch interfaces. Internal hardware accelerators increase performance and efficiency. An embedded processor complex (EPC) 12 includes protocol processors and an internal control point processor for frame processing, configuration and management support.

Up to N parallel protocol processors are available. In an embodiment of 16 protocol processors, 16,384 words of internal picocode instructions store and 32,768 words of external picocode instructions store are available to provide 2,128 million instructions per second (MIPS) of aggregate processing capability. In addition, each protocol processor has access to M hardware accelerator coprocessors which provide high speed pattern search, data manipulation, internal chip management functions, frame parsing, and data prefetching support. In a preferred embodiment control storage for the protocol processors is provided by both internal and external memories: 32K of internal static random access memory (SRAM) 28 for immediate access, external zero bus turnaround (ZBT) SRAM 30 for fast access, and external double data rate (DDR) dynamic random access memory (DRAM) 32 for large storage requirements.

Using embedded hardware accelerators in conjunction with preprocessing algorithms, operating on the attached control point processor 34, the network processor 10 is capable of processing frames through one hundred or more filter rules with complex range, priority, and action specifications at wirespeed. This makes a network processor-based system well suited for gateways, server farm applications, and filtering tasks associated with processing a mix of traffic.

Control point software provides automatic logic checking when a network administrator enters filter rules to a coherent, user-friendly interface. Using novel flow control based upon stability theory, the network processor 10 withstands higher rates of temporary oversubscription without Transmission Control Protocol (TCP) collapse than commonly-used random early discard methods. The network processor 10 also delivers differentiated services by automatically allocating bandwidth, relieving network administrators from having to predict the effects of setting dozens of thresholds on the basis of momentary or assumed traffic statistics.

A single network processor 10 provides media speed switching for up to 40 Fast Ethernet or four Gigabit Ethernet ports. It can also be configured to support OC-48c, OC-48, four OC-12 or sixteen OC-3 ports. For scalability, the two 3.5 Gbps serial DASL links can be used to interconnect two network processors to double the port density, or to attach switch fabrics to create switching solutions with up to 64 network processors. The two DASL links, one primary and one secondary, can also provide connection to a redundant switch fabric for increased system availability.

One exemplary embodiment of a network processor 10 includes the following major sections as illustrated in FIG. 1:

1. An embedded processor complex (EPC) 12 including up to 16 programmable processors plus coprocessors;
2. An enqueue-dequeue-scheduling logic 14 for frames traveling from the Ethernet physical layer devices to the switch fabric (EDS-Ingress);
3. An enqueue-dequeue-scheduling logic 16 for frames traveling from the switch fabric to the Ethernet physical layer devices (EDS-Egress);
4. An ingress switch interface (Switch Ingress) 18 and egress switch interface (Switch Egress) 20 DASL links for interconnection to another network processor or intermediate switch;
5. A physical MAC multiplexer 22 receiving frames from the Ethernet or POS physical layer devices 26 (PMM-Ingress) and the physical MAC multiplexer 24 transmitting frames to the Ethernet or POS physical layer devices 26(PMM-Egress).

Figure 2:
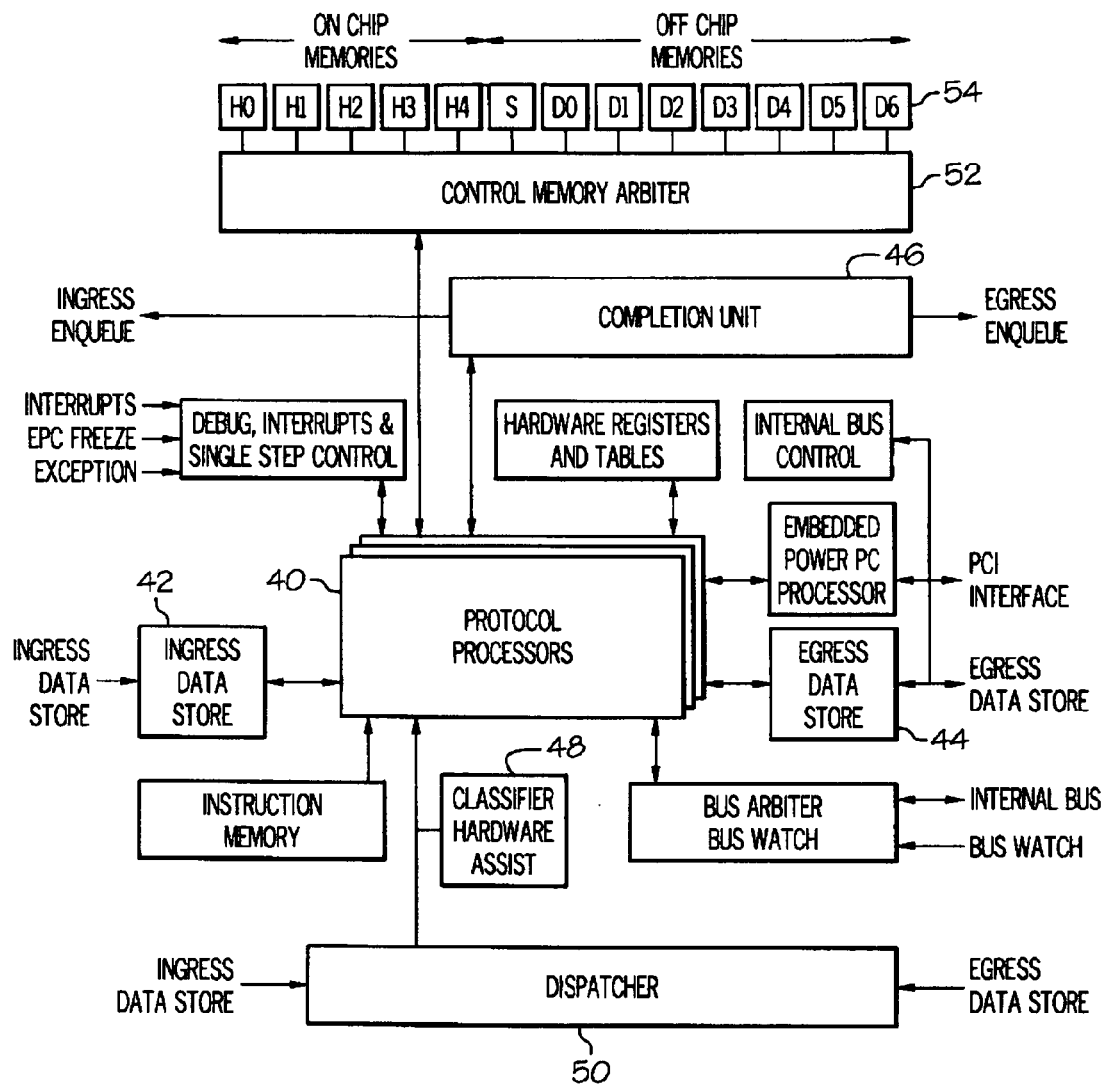
FIG. 2 illustrates an exemplary embodiment for an embedded processor complex in accordance with a preferred embodiment of the present invention.

FIG. 2 illustrates an exemplary embodiment for an embedded processor complex. It contains 16 protocol processors providing 2128 MIPS of processing power. Each protocol processor 40 includes a 3-stage pipeline (fetch, decode and execute), general purpose registers, special purpose registers, an eight instruction cache, a dedicated arithmetic logic unit (ALU) and coprocessors all running at 133 MHz. Two of the protocol processors are specialized: one for handling guided frames (the guided frame handler) and one for building look-up data in control memory (the generic tree handler).

Figure 3:
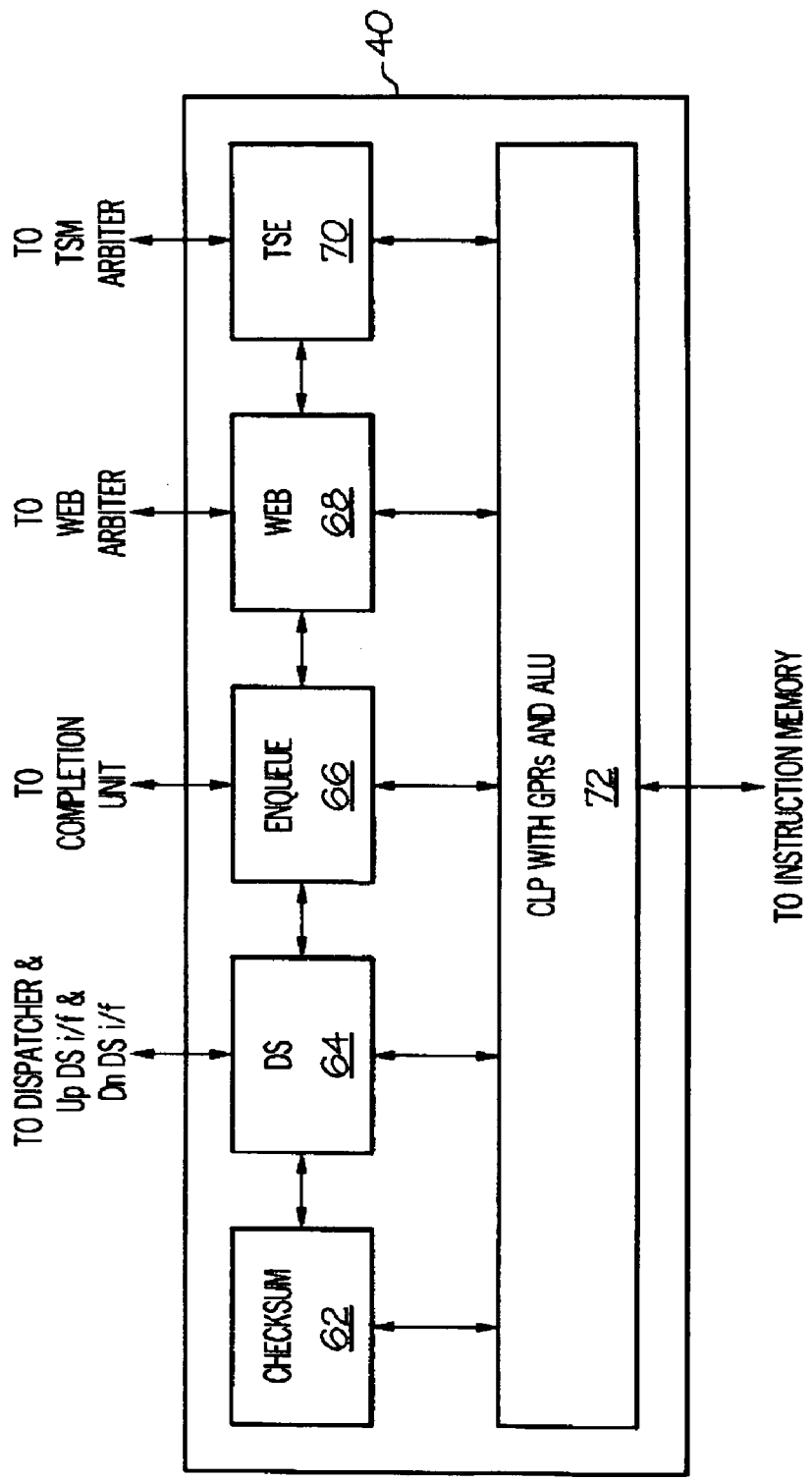
FIG. 3 illustrates an exemplary protocol processor structure in accordance with a preferred embodiment of the present invention.

FIG. 3 illustrates an exemplary embodiment of a protocol processor. The coprocessors associated with each of the programmable protocol processors 40 provide the following functions:

1. A data store coprocessor 64 interfaces frame buffer memory 42, 44 (ingress and egress directions) to provide direct memory access (DMA) capability;
2. A checksum coprocessor 62 calculates header checksums;
3. An enqueue coprocessor 66 controls access to the 256-bit working register, containing key frame parameters. This coprocessor interfaces with the completion unit 46 to enqueue frames to the switch and target port queues;
4. An interface coprocessor provides all protocol processors access to internal registers, counters and memory for debug or statistics gathering;
5. A string copy coprocessor enables efficient movement of data within the EPC;
6. A counter coprocessor manages counter updates for the protocol processors 40;
7. A policy coprocessor examines flow control information and checks for conformance with pre-allocated bandwidth.

Hardware accelerators 48 perform frame forwarding, frame filtering, frame alteration and tree searches. Other features incorporated into the network processor include innovative filter rule processing, hash functions and flow control.

The protocol processors 40 can enforce one hundred or more frame filter rules with complex range and action specifications. Filtering is essential for network security, and network processor hardware assists 48 provide wirespeed enforcement of these complex rule sets. Filter rules can deny or permit a frame or allocate quality of service (QoS) based on Internet Protocol (IP) header information. Control point software for preprocessing rules automatically corrects logic errors. After a logically correct rule set has been entered, keys are formed from packet header information and are tested at wirespeed using the network processor's software managed trees.

Geometric hash functions exploit statistical structures in IP headers to outperform ideal random hashes. Consequently, the low collision rates enable high speed look-ups in full match tables without additional resolution searches.

Figure 14:
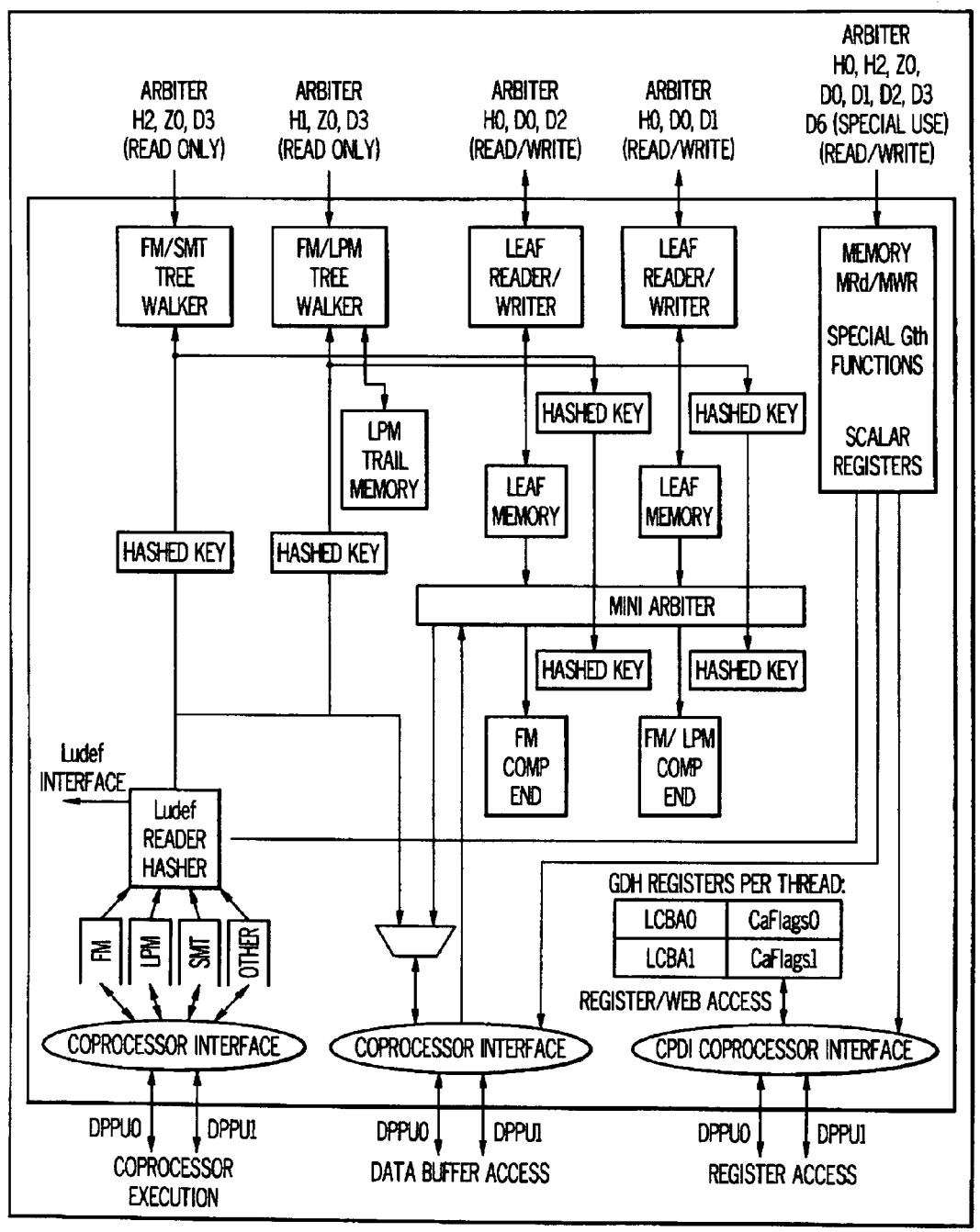
FIG. 14 illustrates an exemplary architecture for a tree search engine in accordance with a preferred embodiment of the present invention.

Operating in parallel with protocol processor execution, the tree search engine 70 performs tree search instructions (including memory read, write or read-write), memory range checking and illegal memory access notification. FIG. 14 illustrates an exemplary embodiment of a tree search engine.

Two system control options are available within the network processor 10. An internal processor 34 can function as the control point (CP) processor for the system or, alternatively, an external processor can be connected to one of the four Ethernet macros for initialization and configuration. The CP processor 34 communicates with other processor entities within the network processors by building special Ethernet frames called guided frames. Guided frames can be forwarded across the DASL links to other devices allowing one CP processor attached to a single Ethernet port to communicate with and control all of the network processor devices contained within the subsystem. The internal processor 34 of each network processor can also communicate using a separate 32-bit PCI bus.

The network processor 10 usually resides on a subsystem board and provides the protocol layer (i.e., layer 2, layer 3, layer 4 and higher) frame processing. Software running on a CP processor 34 in the CP subsystem provides the management and route discovery functions. The CP code, picocode running on the protocol processors, and picocode running on the guided frame handler enable initialization of this system, maintenance of the forwarding paths, and management of the system. As a distributed system, the CP and each network processor subsystem contain multiple processors which operate in parallel and communicate using guided frames for increased efficiency and performance.

Data frames are received from the media by the PMM 22 and transferred to the data storage buffers 42. The PMM also performs CRC checking and frame validation during the receive process. The dispatcher 50 sends up to 64-bytes of frame information to an available protocol processor 40 for frame look-ups. The classifier hardware assist 48 supplies control data to identify frame formats. The protocol processor 40 uses the control data to determine the tree search algorithm to apply including fixed match trees, longest prefix match trees, or software managed trees.

Look-up is performed with the aid of a tree search engine (TSE) 70. The TSE 70 performs control memory 72 accesses, enabling the protocol processor to continue execution. The control memory 72 stores all tables, counters and any other data needed by the picocode. For efficiency, a control memory arbiter 52 manages control memory operations by allocating memory cycles between the protocol processors 40 and a variety of on-chip and off-chip control memory options 54.

The protocol processor 40 contains a primary data buffer, a scratch pad data buffer and control registers (collectively, 72) for data store operations. Once a match is found, ingress frame alterations, such as VLAN header insertion or overlay, can be applied. These alterations are not performed by the EPC 12. Instead, the ingress switch interface hardware 18 performs the alteration if the hardware flags are set. Other frame alterations can be accomplished by the picocode and the data store coprocessor 64 by modifying the frame contents held in the ingress data store 42.

Control data is gathered and used to build switch headers and frame headers prior to sending frames to the switch fabric. Control data includes switch information such as the destination of the frame, as well as information for the egress network processor, to help it expedite frame look-up of destination ports, multicast or unicast operations, and egress frame alterations.

Figure 4:
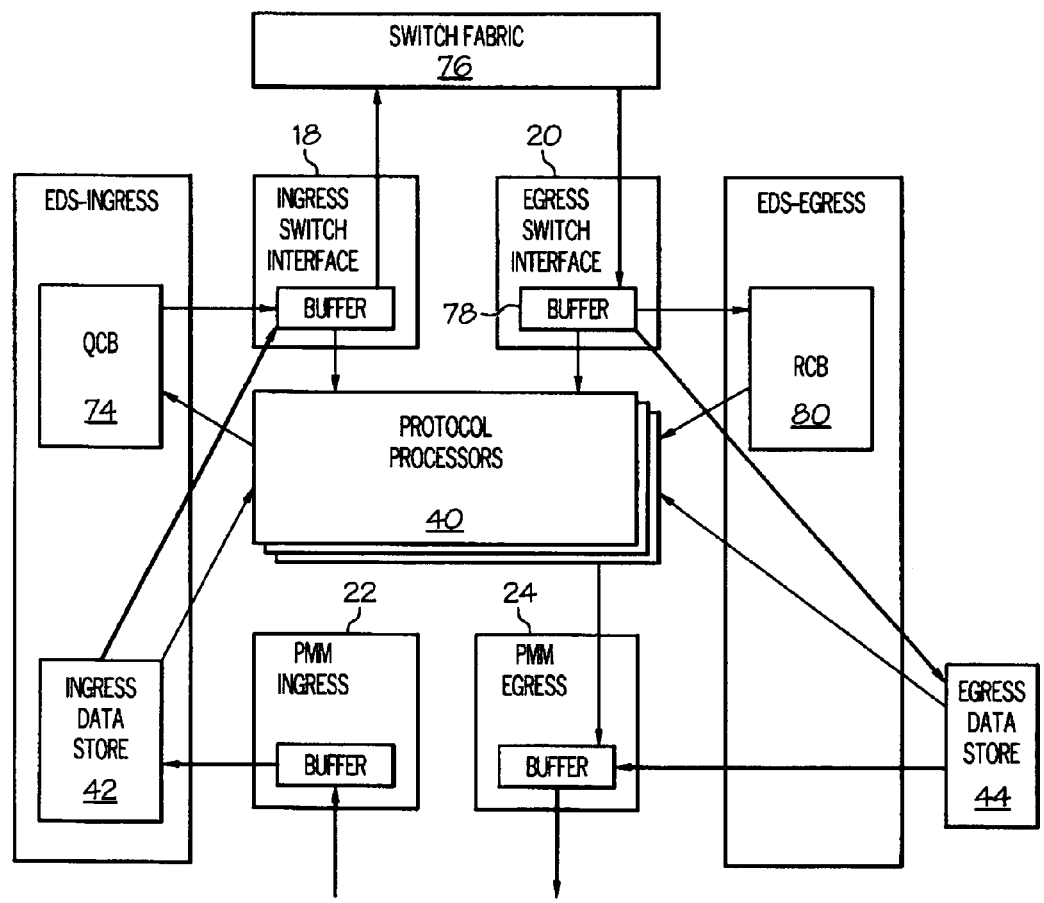
FIG. 4 illustrates exemplary ingress and egress frame flows in accordance with a preferred embodiment of the present invention.

FIG. 4 illustrates exemplary ingress and egress frame flows. Upon completion, the enqueue coprocessor 66 builds the necessary formats for enqueuing the frame to the queue control block (QCB) 74 and forwards them to the completion unit 46. The completion unit 46 guarantees frame order from the up to 16 protocol processors to the switch fabric queues 76. Frames from the switch fabric queues are segmented into 64-byte cells with switch header and frame header bytes inserted as they are transmitted by the switch fabric 76.

Frames received from the switch fabric 76 are placed in egress data store buffers 78 using information provided by the reassembly control block (RCB) 80 and the EDS-Egress 44 and are enqueued to the EPC 12. A portion of the frame is sent by the dispatcher 50 to any idle protocol processor 40 for performing the frame look-ups. Frame data is dispatched to the protocol processor 40 along with data from the classifier hardware assist 48. The classifier hardware assist 48 uses frame control data created by the ingress network processor to help determine the beginning instruction address for egress processing.

Egress tree searches support the same algorithms as are supported for ingress searches. Look-up is performed with the TSE 70, freeing the protocol processor 40 to continue execution. All control memory operations are managed by the control memory arbiter 52, which allocates memory access among the processor complexes.

Egress frame data is accessed through the data store coprocessor 64. The results of a successful look-up contains forwarding information and, in some cases, frame alteration information. Egress frame alterations can include VLAN header deletion, time to live increment (IPX) or decrement (IP), IP header checksum recalculation, Ethernet frame CRC overlay and MAC destination address or source address overlay or insertion. IP header checksums are prepared by the checksum coprocessor 62. Alterations are not performed by the embedded processor complex 12, but rather hardware flags are created and PMM egress hardware 24 performs the alterations. Upon completion, the enqueue coprocessor 46 is used to build the necessary formats for enqueuing the frame in the EDS egress queues 44 and forwards them to the completion unit 46. The completion unit 46 guarantees frame order from the up to 16 protocol processors to the DS egress queues 44 feeding the egress Ethernet MACs. The completed frames are finally sent by the PMM egress hardware 24 to the Ethernet MACs or the POS interface and out the physical ports.

Figure 5:
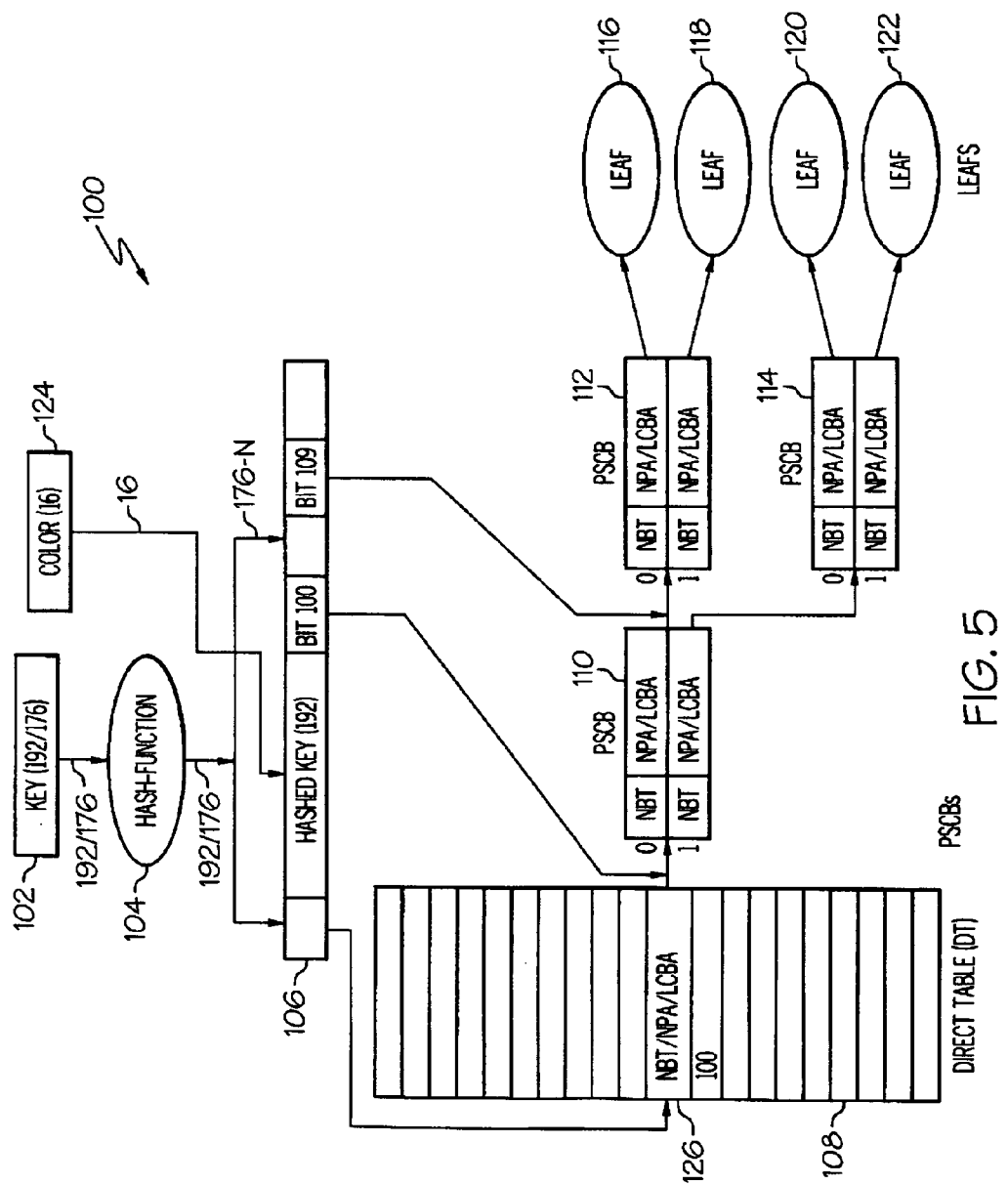
FIG. 5 illustrates a tree data structure for the full match search algorithm in accordance with a preferred embodiment of the present invention.

The tree search engine (TSE) 70 as depicted in FIG. 14 uses the concept of trees to store and retrieve information. Retrieval, i.e., tree-searches as well as inserts and deletes are done based on a key, which is a bit-pattern such as, for example, a MAC source address, or the concatenation of an IP source address and an IP destination address. An exemplary tree data structure 100 for use in the present invention is depicted in FIG. 5. Information is stored in a control block called a leaf 116, 118, 120, 122, which contains at least the key 102 (the stored bit pattern is actually the hashed key 106). A leaf can also contain additional information such as aging information, or user information, which can be forwarding information such as target blade and target port numbers. The format of a leaf is defined by picocode; the object is placed into an internal or external control store.

The search algorithm for trees operates on input parameters including the key 102, performs a hash 104 on the key, accesses a direct table (DT) 108, walks the tree through pattern search control blocks (PSCBs) 110, 112, 114 and ends up at a leaf 116, 118, 120, 122. Each type of tree has its own search algorithm causing the tree-walk to occur according to different rules. For example, for fixed match (FM) trees, the data structure is a Patricia tree. When a leaf has been found, this leaf is the only possible candidate that can match the input key 102. A "compare at the end" operation compares the input key 102 with the pattern stored in the leaf. This verifies if the leaf really matches the input key 102. The result of this search will be success (OK) when the leaf has been found and a match has occurred, or failure (KO) in all other cases.

The input to a search operation contains the following parameters:

| key | The 176 bit key must be built using special picocode instructions prior to the search or insert/delete. There is only one key register. However, after the tree search has started, the key register can be used by the picocode to build the key for the next search concurrently with the TSE 70 performing the search. This is because the TSE 70 hashes the key and stores the result in an internal HashedKey register 106. |
|---|---|
| key length | This 8 bit register contains the key minus one bit. It is automatically updated by the hardware during the building of the key. |
| LUDefIndex | This is an 8 bit index into the lookup definition table (LUDefTable), which contains a full definition of the tree in which the search occurs. The internal structure of the LUDefTable is illustrated in FIG. 11. |
| TSRNr | The search results can be stored either in 1 bit Tree Search Result Areas TSR0 or TSR1. This is specified by TSRNr. While the TSE is searching, the picocode can access the other TSR to analyze the results of a previous search. |
| color | For trees which have color enabled (specified in the LUDefTable), the contents of a 16 bit color register 124 is inserted in the key during the hash operation. |

The lookup definition table is the main structure which manages tree search memory. The LUDefTable is an internal memory structure and contains 128 entries for creating trees. The LUDefTable contains entries that define the physical memory the tree exists in (e.g., DRAM, SRAM, internal RAM), whether caching is enabled, the size of the key and leaf, and the type of search action to perform. The LUDefTable is implemented as three separate random access memories—one RAM that is accessible only by the general processor tree handler (GTH) and two RAMs that are duplicates of each other and are accessible by all picoprocessors.

The output of the hash function 104 is always a 176-bit number which has the property that there is a one-to-one correspondence between the original input key 102 and the output of the hash function 104. As will be explained below, this property minimizes the depth of the tree that starts after the direct table 108.

If colors are enabled for the tree, which is the case in the example of FIG. 4, the 16-bit color register 124 is inserted in the 176-bit hash function output and the file result is a 192-bit number, called the HashedKey 106. The insertion occurs directly after the direct table 108. If the direct table 108 contains $2^N$ entries, then the 16-bit color value is inserted at bit position N, as shown in FIG. 4. The output of the hash function, together with the inserted color value, is stored in the HashedKey register 106. If colors are disabled for a tree, the 176-bit hash function is taken unmodified, and 16 zeros are appended to the hash output to produce the 192-bit final HashedKey.

Colors can be used to share a single direct table 108 among multiple independent trees. For example, one use of a color could be a virtual local area network (VLAN) ID in a MAC source address (SA) table. In this case, the input key 102 would be the MAC SA, and the color 124 would be the VLAN ID (since the VLAN ID is 12 bits, four bits of the color would be unused, i.e., set to zero). After the hash function 104, the pattern used is 48+16=64 bits. The color is now part of the pattern and will distinguish between MAC addresses of different VLANs.

The hash function 104 is defined such that most entropy in its output resides in the highest bits. The N highest bits of the HashedKey register 106 are used to calculate an index into the direct table (DT) 108.

For SMT trees, the input key and color together form a 192-bit input pattern. In this view, the color register should be seen as an extension to the key register. SMT trees must have the color enable bit set to '0'. Furthermore, SMT trees must use a hash function, which takes the 176-bit input key 102 together with the 16-bit color register 124 and produces a 192-bit HashedKey 106, whereby the key forms the 176 leftmost bits and the color forms the 16 rightmost (LSB) bits. Thus, hash function for SMT trees is not really a hash function, but a means to use the color as an extension of the key.

To achieve storage as well as search efficiency, this implementation makes use of following data structures:
 a. pattern/key that needs to be searched;
 b. direct table (DT) entry;
 c. pattern search control blocks (PSCB);
 d. leaf;
 e. compare at the end operation; and
 f. compare table entry.

A DT entry is the first address location based on the first "N" bits of the key. It includes 3 parts described below. A PSCB entry is an intermediate node location. A leaf entry is the address location for the search result. A compare table entry describes the leaf/pattern comparison parameters. A DT entry either has a shape defined by a width of one and a height of one, or a width of one and a height of two as described further below.

A PSCB represents a branch in the tree. In the preferred embodiment there is a 0-branch and a 1-branch. The number of branches emanating from a PSCB is variable depending on the number of bits used to designate the branches. If n bits are used, then $2^n$ branches are defined at the PSCB. Each PSCB is also associated with a bit position p. All leaves that can be reached from the PSCB through the O-branch have a '0' at position p in the pattern, and the leaves that can be reached through the 1-branch have a '1' at position p. Furthermore, all leaves that can be reached from a PSCB will always have patterns at which bits 0 . . . p-1 are identical, i.e., the patterns start to differ at position p. The bit position associated with a PSCB is stored in the previous PSCB or in a DT entry and is called the NBT (i.e., next bit to test).

Thus, PSCBs are only inserted in the tree at positions where leaf patterns differ. This allows efficient search operations since the number of PSCBs, and thus the search performance, depends only on the number of leaves in a tree and not on the length of the patterns. The PSCB register format is depicted in FIG. 12.

In a SMT Tree, the first leaf after a PSCB must have the shape defined in the LUDefTable. Any other leaf, in a leaf chain, has the shape defined by 5 bits in the chaining pointer, which is the NLASMT field in a leaf.

The formats of DT and PSCB entries are identical and include the following parts:
  a. SCB (search control block) 2 bits.
  b. NPA (next pattern address): points to the next PSCB address or LCBA (leaf control block address): points to the leaf/result.
  c. NBT (next bit or bits to test): Can be the next pair or group of "x" (x=1 or n) bits to test. The number of bits to be tested is determined based on the storage efficiency, etc.
  d. direct leaf.

Each entry in this implementation is 36 bits wide and contains one of three possible currently defined entry formats:
  a. Empty DT entry: SCB=00 and NPA=0 and NBT is invalid or zero.
  b. The NPA/NBT is valid: SCB=00 and NPA and NBT are valid. For a DT entry, the NPA points to the first intermediate node and the NBT points to the bit or bits to be tested. In the case of a PSCB entry, the NPA points to other nodes in the trail.
  c. The LCBA is valid: SCB=01. The LCBA points to an associated leaf address, i.e., the search result.
  d. Direct leaf: SCB=10 and rest of the data contains the search result or leaf. Part of the leaf data can include chaining of leaf addresses to support large search result storage.

With regard to memory allocation of DT and PSCB Entries: SMT PSCBs have the same structure as a SMT DT entry except that they always consist of 2**no_of_bits_to_be_tested addresses, i.e., in pair/groups. These pairs or group of address are allocated consecutively in memory and are used as a branch/jump pointer for walking the search tree.

The format of a leaf in a SMT tree contains control information including two patterns. The two patterns are used to define range compares. Leaves in a SMT can be chained using the NLASMT filed. FIG. 13 illustrates the format for a SMT tree. When the first leaf is reached after a PSCB, a compare at the end operation is performed. When this returns OK, the search stops. However, when the compare at the end returns KO and there is a non-zero NLASMT field, the next leaf is read and another compare at the end operation is performed. This process continues until either a compare at the end returns OK, or until the NLASMT filed equals zero, in which case the search returns with KO.

The high level algorithm flow for the software management tree search is as follows:
  1. Read the DT entry.
     a. if SCB=00 and NPA and NBT are valid then read the NPA and NBT to generate the next PSCB address;
     b. if NBT is not valid and a direct leaf is valid, read the leaf contents and go to the leaf evaluation step;
     c. if NBT is not valid and/or a leaf is not present; return KO, i.e., failure for the search result and completion flag as done.
  2. Leaf evaluation: compare the pattern (key) and the pattern stored in the leaf. The SMT always contains two patterns. These two patterns are used to define a range compare. Also, leaves in a SMT can be chained (i.e., using NLASMT which represents the next leaf address). When the first leaf is a hit after the PSCB, a compare-at-the-end operation is performed. When this returns OK (success), the search stops with OK. However, when this compare-at-end returns KO (failure) and there is a non-zero, i.e., valid NLASMT field, the next leaf is read and another compare at the end operation is performed. This operation continues until either a compare at the end returns with OK (success) or until the NLASMT field is no longer valid, in which case the search returns with KO (failure).

The bit/register width values described herein are exemplary and can be changed to different values to optimize the available memories, performance requirements, etc.

The search starts with an access into the direct table 108, i.e., a DT entry is read from the direct table. The address used to read the DT entry is calculated from the N highest bits of the HashedKey in register 106, as well as on tree-properties as defined in the LUDefTable. The DT entry can be seen as the root of a tree. The actual tree data structure depends on the tree-type. Extensions to a Patricia tree data structure are used for SMT trees.

An example of the use of an 8 entry DT 108 is shown in FIG. 6. It can be seen that the search time, i.e., the number of PSCBs that must be accessed, can be reduced by using a DT. Thus, by increasing the DT size, a trade-off can be made between memory usage and search performance.

For performance reasons, it is inefficient to read a DT entry only to find that it contains a pointer to a leaf, after which the leaf itself must be read. This situation will occur very often for FM trees, which have many single leaf entries per DT entry. The concept of a direct leaf allows a trade-off between more memory usage and better performance.

A tree can have direct leaves enabled, which is specified in the lookup definition table (LUDefTable). The difference between trees with direct leaves enabled and disabled is illustrated in FIG. 7. When direct leaves are enabled and a DT entry contains a single leaf, this leaf is stored directly in the DT entry itself. Otherwise, the DT entry will contain a pointer to the leaf.

Shaping is a feature of the TSM and is used to specify how an object, like a leaf or PSCB, is stored in the TSM. The shape is defined by the parameters width and height. The height of an object denotes the number of consecutive address locations at which the object is stored. The width of an object denotes the number of consecutive banks at which the object is stored. For width and height, the hardware automatically reads the appropriate number of locations. From a picocode point of view, an object is an atomic unit of access. The width must always be 1 for objects stored in SRAM. The width may be greater than 1 for objects in DRAM. Objects that are small enough to fit within a single memory location are defined to have a height of one and a width of one. The shape of a DT entry with direct leaves disabled is always (W=1, H=1). When the DT entry is stored in dynamic random access memory (DRAM), it occupies exactly 64-bits. The shape of a DT entry with direct leaves enabled equals the shape of the leaf, which is specified in the LUDefTable. In general, this causes more memory to be used by the DT 108. It also causes an impact of the leaf shape on the DT entry address calculation.

After a DT entry has been read and assuming the DT entry does not contain a direct leaf nor is it empty, the search continues by walking the tree that starts at the DT entry. The tree-walk may pass several PSCBs (pattern search control blocks), until a leaf has been reached.

When a PSCB is encountered during a search in an SMT tree, the tree search engine hardware will continue the tree-walk on the 0-branch or the 1-branch, depending on the value of bit p of the HashedKey.

Figure 10:
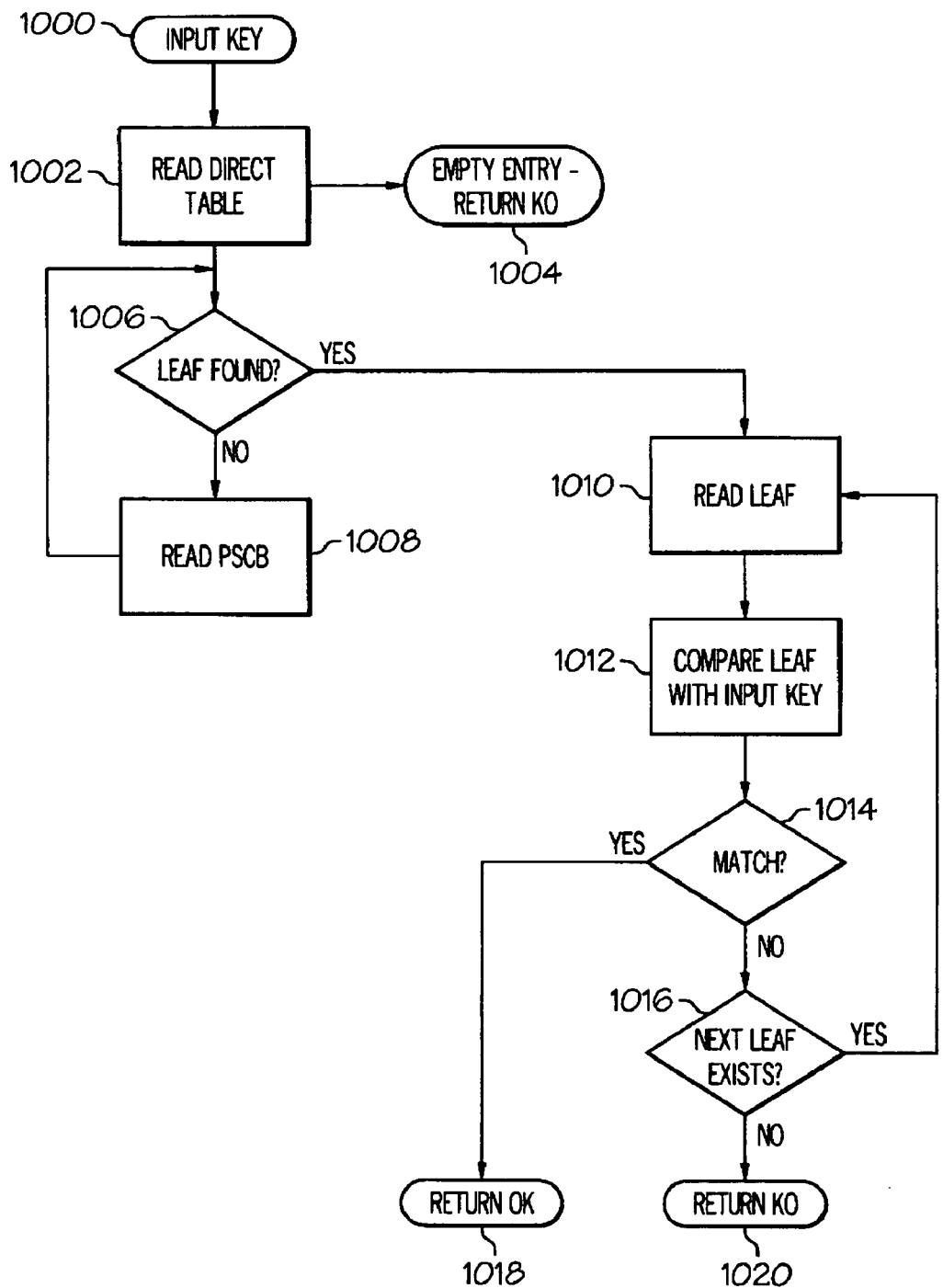
FIG. 10 illustrates the processing logic of the Software Management Tree search algorithm in accordance with a preferred embodiment of the present invention.

FIG. 10 illustrates the processing logic of the software management tree search algorithm of the present invention. The algorithm begins in logic block 1100 with the reading of an input key. In an SMT search, the input key is optionally hashed into a hashed key. The hash function may reverse the order of the bits in the input key. For example, it may swap bit one and bit seven. When a hash function is used, it may be programmable, i.e., it can be programmed as to which bits are swapped. As indicated by logic block 1002, the direct table is next read. The upper N bits (whereby N is configurable) of the hashed key are used as an index into a direct table. When the entry that has been read is empty, the search returns KO (nothing found) as indicated by termination block 1004. If the entry points to a leaf in decision block 1006, then processing continues at logic block 1010 with the reading of the contents of the leaf. Otherwise, the entry points to a PSCB and the appropriate part of a PSCB is read as indicated in logic block 1008. For a SMT search, a PSCB can have the format of a FM PSCB. Alternatively, it can have a more advanced format as described below.

From logic block 1008 processing returns to decision block 1006 to determine if a leaf is found. When a leaf is found in decision block 1006, the leaf is read as indicated by logic 1010 and then compared with the input key as indicated by logic block 1012. If there is a match between the pattern stored in the leaf and the input key in decision block 1014, then the search returns OK (success) and passes the contents of the leaf to the application as indicated by termination block 1018. If there is no match in decision block 1014, then processing continues as indicated in decision block 1016 with a determination of whether a next leaf exists. If there is a next leaf in the leaf chain, processing moves back to logic block 1010 to read the contents of the leaf. Otherwise, if there is no next leaf, the search returns KO (failure) as indicated by termination block 1020.

The compare operation between the leaf pattern and the hashed key is more complicated than it is with FM and LPM searches. The leaf contains two patterns, p1 and p2. The hashed key in p1 and p2 are each logically divided into N fields. The compare operation includes N sub-compares that all must return OK (success) in order for the total compare to return OK. Each sub-compare can be performed according to two modes: (i) p1 represents a minimum and p2 a maximum, or (ii) p1 represents a pattern and p2 represents a mask. In the first case, the sub-compare returns OK when p1≦hashed key≦p2. In the second case, the sub-compare returns OK when (hashed key AND p2)=(p1 AND p2).

The definition of the fields (the size of each field and the position), as well as the compare mode for each field can be stored in encoded form in the leaf, or it can be stored in a special look-up table. In the preferred embodiment, a CompDefTable is used, whereby the index of the table is stored in the leaf.

As an extension, a PSCB may consist of $2^b$ entries, such that b bits from the hashed key select which entry to read from the PSCB. This increases performance at a cost of more memory usage. Furthermore, a PSCB can be extended such that each entry contains one or two patterns (p1 and p2) that operate in the same way as described with the leaf compare. For example, assume that the PSCB contains p1 and p2 with length L which is also stored in the PSCB. Then L bits are taken from the hashed key at the position given by NBT. These L bits are interpreted as an integer I. When p1≦I≦p2, then entry 1 is used from the next PSCB, otherwise entry 0 is used from the next PSCB.

A cache can be used for increasing the search performance in trees. Use of a cache can be enabled in the LUDefTable on a per tree basis. During a search, the tree search engine 70 will first check in the cache to determine if a leaf is present that matches the HashedKey. If such a leaf is found, it is returned and no further search is required. If such a leaf is not found, a normal search starts.

For the tree search engine hardware 70, a cache look-up is exactly identical with a normal search. Thus, the input key is hashed into a HashedKey, and a direct table 108 access is performed. The direct table 108 acts as a cache. When the cache search returns OK (success), the search ends. Otherwise, the tree search engine starts a second search in the full tree—except that no hash operation is performed. The contents of the HashedKey register 106 are reused.

It can be specified in the LUDefTable if a cache search is used. If a cache search uses LUDefTable entry I and the search ends KO (failure), another search using LUDefTable entry I+1 starts automatically. In principle, this allows multiple searches to be chained, although it is recommended that the full tree be stored under LUDefTable entry I+1.

The tree search engine 70 provides hardware search operations in FM trees, LPM trees and SMT trees. For all tree types varying amounts of software are required to initialize and maintain a tree. Only FM trees and LPM trees have the capability that insertion and removal of leaves can be done without the intervention of control point processor 34. The use of this feature allows for a scalable configuration and still has the flexibility to allow the CP 34 to insert or remove leaves if needed.

SMTs provide a mechanism for the CP to create tree structures that follow a search mechanism defined by the CP. An example of this would be an IP 5-tuple filtering table, containing IP source address (IPSA), IP destination address (IPDA), source port, destination port and protocol. In contrast to FM and LPM trees, SMTs provide support for ranges. For example, a leaf can be used to specify that the source port must be in a range 100 . . . 110.

The following differences exist between SMT and FM/LPM trees:
  SMTs always contain two patterns in the leaf. The two patterns are used to define range compares, as explained below.
  Leaves in an SMT can be chained using the next leaf address (NLASMT) field. When the first leaf is hit after a PSCB, a compare at the end operation is performed. When this returns OK (success), the search stops with the OK. However, when this returns KO (failure) and there is a non-zero NLASMT field, the next leaf is read and another compare at the end operation is performed. This process continues until either a compare at the end returns OK (success), or until the NLASMT field equals zero, in which case the search returns with KO (failure).

In contrast with FM and LPM trees, SMTs contain two patterns of the same length in each leaf. For the purpose of compare operations, the input key (and similarly, the two patterns stored in the leaf) can logically be divided into multiple fields. An example is illustrated in FIG. 8. For each field, one of two compares can be performed:

1. Compare under mask. The bits in the input key are compared with the bits in leaf pattern0 under a mask specified in leaf pattern1. A '1' in the mask denotes that the corresponding bit in the input key must equal the corresponding bit in pattern0, a '0' in the mask denotes that the corresponding bit in the input key has no influence on the compare. Only if all bits compare OK does the entire field compare OK.
2. Compare under range. The bits in the input key are treated as an integer which is checked to determine if it is in the range given by the Min and Max (both are inclusive in the range). If this is the case, the field compares OK, otherwise the field compares KO. Only if all fields compare OK, does the entire compare at the end return OK, otherwise the compare at the end returns KO.

The definition of how the logical fields are defined is specified in the compare definition table (CompDefTable), of which an example of an entry format is given in FIG. 9. By default, a field is a compare under mask field, unless there is an entry in the CompDefTable that specifies otherwise.

Each entry in the CompDefTable specifies one or two range compares. As will be explained below, multiple entries can be used to specify more than two range compares. Each range compare is defined by two parameters:

Offset, which is the position of the first bit of the field. The offset must be at a 16-bit boundary and can have the following values: 0, 16, 32, 48, 64, 80, 96, 112 or 128.

Length of the field in bits. Lengths can have the following values: 8, 16, 24, or 32.

For example, for the key shown in FIG. 8, the compare under range for the source port field would have Offset0 set to 64 and Min/MaxLength0 set to 16 and the compare under range for the destination port field would have Offset1 set to 80 and Min/MaxLength1 set to 16. If more than two range compares are required, the continue bit must be set to 1, which causes the next entry in the CompDefTable to be used for another one or two compare under range definitions. The index in the CompDefTable that is used for the SMT compare is specified in the leaf.

For performance reasons, it is recommended that as few compare-under-range operations be used as possible. Each compare-under-range costs one extra clock cycle (7.5 nsec) to execute. Therefore, if a range is a power of two (i.e., 128–255), no compare-under-range is required and this kind of range can be handled using the compare-under-mask operation.

When an SMT compare at the end fails, and the NLASMT field in the leaf is non-zero, then the TSE 70 reads the next leaf and performs another compare at the end operation, until either the compare returns OK, or until NLASMT equals zero.

The present invention can be realized in hardware, software, or a combination of the two. Any kind of computer system or other apparatus adapted for carrying out the methods described herein is suited. A typical combination of hardware and software could be a general purpose computer system that, when loaded and executed, controls the computer system such that it carries out the methods described herein. The present invention can also be embedded in a computer program product, which comprises all the features enabling the implementation of the methods described herein, and which when loaded in a computer system, is able to carry out these methods.

Computer program instructions or computer program in the present context mean any expression, in any language, code (i.e., picocode instructions) or notation, of a set of instructions intended to cause a system having an information processing capability to perform a particular function either directly or after either or both of the following occur: a) conversion to another language, code or notation; b) reproduction in a different material form.

Those skilled in the art will appreciate that many modifications to the preferred embodiment of the present invention are possible without departing from the spirit and scope of the present invention. In addition, it is possible to use some of the features of the present invention without the corresponding use of other features. Accordingly, the foregoing description of the preferred embodiment is provided for the purpose of illustrating the principles of the principles of the present invention and not in limitation thereof, since the scope of the present invention is defined solely by the appended claims.

What is claimed is:

1. A method for performing a pattern range comparison for a variable length search key in a software managed tree by a computer processing device, comprising the acts of:
   reading an input key as a search string;
   using the N most significant bits of the search key as an index into a table representing a plurality of root nodes of search trees wherein each non-empty entry contains a pointer to a next branch in the search tree or a leaf;
   determining if the pointer in a non-empty table entry points to a leaf or a next branch of the corresponding search tree;
   reading the next branch contents if the pointer does not point to the leaf of the corresponding search tree;
   reading the leaf contents when the leaf of a corresponding search tree is reached and comparing a pair of patterns in the leaf with the search key to determine if the range defined by the pair of leaf patterns includes the search key; and
   returning the contents of the leaf found to the requesting application if the leaf patterns include the search key.

2. The method for performing the pattern range comparison of claim 1 further comprising hashing the input key using a programmable hash function to form a search key.

3. The method for performing the pattern range comparison of claim 1 wherein the table representing a plurality of root nodes of search trees contains 2N entries.

4. The method for performing the pattern range comparison of claim 1 wherein the computer processing device is a network processor.

5. The method for performing the pattern range comparison of claim 1 wherein the contents of the next branch of the corresponding search tee points to another next branch.

6. The method for performing the pattern range comparison of claim 1 wherein the contents of the next branch points to the leaf of the corresponding search tree.

7. The method for performing the pattern range comparison of claim 1 further comprising returning a no success indication if the leaf patterns do not include the search key and do not contain a pointer to another leaf.

8. The method for performing the pattern range comparison of claim 1 further comprising returning a no success indication if the index into the table is to an empty entry.

9. The method for performing the pattern range comparison of claim 1 further comprising appending the contents of a color register to the search key to provide a final search key.

10. The method for performing the pattern range comparison of claim 1 further comprising appending a string of zeros to the search key to provide a final search key.

11. The method for performing the pattern range comparison of claim 1 wherein the act of comparing a pair of patterns comprises compare under range operation in which the bits in the search key are treated as an integer that is checked to determine if it is in a range defined by the pair of patterns.

12. The method of claim 1 wherein the act of comparing a pair of patterns comprises a compare under mask operation in which the bits in the search key are compared with the bits in a first leaf pattern under a mask specified in a second leaf pattern.

13. The method for performing the pattern range comparison of claim 1 further comprising the acts of:
if the leaf contains a chain pointer to another leaf, reading a pair of patterns stored in another leaf and comparing the patterns with the search key; and
returning an indication of no success if the patterns stored do not include the search key and do not contain a pointer to a next leaf in the chain.

14. The method for performing the pattern range comparison of claim 1 further comprising the acts of:
if the leaf contains a chain pointer to another leaf, reading a pair of patterns stored in another leaf and comparing the patterns with the search key; and
returning an indication of success if the patterns stored include the search key.

15. A computer readable medium containing a plurality of data structures for performing a pattern range comparison for a variable length search key in a software managed tree, comprising:
a pattern or key that is to be searched;
a direct table that stores a first address location for a search tree;
a plurality of pattern search control blocks that each represent a branch in the search tree;
a compare table that specifies at least one range compare associated with each entry;
a programmable color key register to enable sharing a single table data structure among a plurality of independent search trees; and
a plurality of leaves wherein each leaf stores a pair of patterns to compare with the search key.

16. The computer readable medium containing a plurality of data structures for performing the pattern range comparison of claim 15 wherein comprising a lookup definition table that manages a tree search memory.

17. The computer readable medium containing a plurality of data structures for performing the pattern range comparison of claim 15 wherein the lookup definition table comprises entries that define a physical memory that the tee resides in, a size of the key and leaf, and a type of search to be performed.

18. The computer readable medium containing a plurality of data structures for performing the pattern range comparison of claim 15 wherein the lookup definition table is implemented in a plurality of memories.

19. The computer readable medium containing a plurality of data structures for performing the pattern range comparison of claim 15 wherein a format for a direct table entry includes at least one of: a search control block; a next pattern address that point to a next pattern search control block; a leaf control block address that points to a leaf or result; a next bit or bits to test; and a direct leaf.

20. The computer readable medium containing a plurality of data structures for performing the pattern range comparison of claim 15 wherein a format for a pattern search control block includes at least one of: a search control block; a next pattern address that point to a next pattern search control block; a leaf control block address that points to a leaf or result, and a next bit or bits to test.

21. The computer readable medium containing a plurality of data structures for performing the pattern range comparison of claim 15 wherein the compare table comprises entries that define at least one range compare, each range compare being defined by an offset parameter which is a position of the first bit of the field and a length parameter which is the length of the field in bits.

22. The computer readable medium containing a plurality of data structures for performing the pattern range comparison of claim 15 wherein a leaf data structure includes at least one of a leaf chaining pointer; a prefix length; a pair of patterns to be compared to the search key; and variable user data.

23. The computer readable medium containing a plurality of data structures for performing the pattern range comparison of claim 15 wherein the direct leaf is stored directly in a direct table entry and includes a search control block and a pair of patterns to be compared to a search key.

24. The computer readable medium containing a plurality of data structures for performing the pattern range comparison of claim 15 wherein a pattern search control block is inserted in the search tree at a position where the leaf patterns differ.

25. The computer readable medium containing a plurality of data structures for performing the pattern range comparison of claim 15 wherein a pattern search control block has a shape defined by a width of one and a height of one and is stored in a memory that has a line length of at least 36 bits.

26. An apparatus fabricated on a semiconductor substrate for performing a pattern range comparison for a variable length search key in a software managed tree, comprising:
an embedded processor complex including a plurality of protocol processors and an internal control point processor that provide frame processing;
a plurality of hardware accelerator co-processors accessible to each protocol processor and providing high speed pattern searching, data manipulation, and frame parsing;
a plurality of programmable memory devices that store a plurality of data structures that represent at least one search tree, wherein the data structures include a direct table, a pattern search control block, a compare table and a leaf including a pair of patterns to compare with the search key;
a programmable color key register to enable sharing a single table data structure among a plurality of independent search trees; and
an control memory arbiter that controls the access of each protocol processor to the plurality of memory devices.

27. The apparatus fabricated on a semiconductor substrate for performing the pattern range comparison of claim 26 further comprising a tree search engine that operates in parallel with protocol processor execution to perform tree search instructions including memory reads and writes and memory range checking.

28. The apparatus fabricated on a semiconductor substrate for performing the pattern range comparison of claim 26 wherein the plurality of memory devices further comprises at least one of internal static random access memory, external static random access memory, and external dynamic random access memory.

29. The apparatus fabricated on a semiconductor substrate for performing the pattern range comparison of claim 26 wherein the control memory arbiter manages control memory operations by allocating memory cycles between the plurality of protocol processors and the plurality of memory devices.

30. The apparatus fabricated on a semiconductor substrate for performing the pattern range comparison of claim 26 wherein each protocol processor comprises a primary data buffer, a scratch pad data buffer and control registers for data store operations.

31. The apparatus fabricated on a semiconductor substrate for performing the pattern range comparison of claim 26 further comprising a hash box component that performs a geometric hash function on the search key.

32. The apparatus fabricated on a semiconductor substrate for performing the pattern range comparison of claim 26 further comprising a programmable search key register and a programmable hashed key register.

33. The apparatus fabricated on a semiconductor substrate for performing the pattern range comparison of claim 26, wherein the contents of the color register, if enabled, are appended to the hash output to produce a final hashed key.

34. The apparatus fabricated on a semiconductor substrate for performing the pattern range comparison of claim 26, wherein if the color register is not enabled, appending an equivalent number of zeros to the hash output to produce a final hashed key.

35. A computer readable medium containing a computer program product for performing a pattern range comparison for a variable length search key in a software managed tree, comprising:
   program instructions that read an input key as a search string;
   program instructions that use the N most significant bits of the search key as an index into a table representing a plurality of root nodes of search trees wherein each non-empty entry contains a pointer to a next branch in the search tree or a leaf;
   program instructions that determine if the pointer in a non-empty table entry points to a leaf or a next branch of the corresponding search tree;
   program instructions that read the next branch contents if the pointer does not point to the leaf of the corresponding search tree;
   program instructions that read the leaf contents when the leaf of a corresponding search tree is reached and compare a pair of patterns in the leaf with the search key to determine if the range defined by the pair of leaf patterns includes the search key; and
   program instructions that return the contents of the leaf found to the requesting application if the leaf patterns include the search key.

36. The computer program product for performing the pattern range comparison of claim 35 further comprising program instructions that hash the input key using a programmable hash function to form a search key.

37. The computer program product for performing the pattern range comparison of claim 35 wherein the table representing a plurality of root nodes of search trees contains 2N entries.

38. The computer program product for performing the pattern range comparison of claim 35 wherein the computer processing device is a network processor.

39. The computer program product for performing the pattern range comparison of claim 36 wherein the contents of the next branch of the corresponding search tree points to another next branch.

40. The computer program product for performing the pattern range comparison of claim 35 wherein the contents of the next branch points to the leaf of the corresponding search tree.

41. The computer program product for performing the pattern range comparison of claim 35 further comprising program instructions that return a no success indication if the leaf patterns do not include the search key and do not contain a pointer to another leaf.

42. The computer program product for performing the pattern range comparison of claim 35 further comprising program instructions that return a no success indication if the index into the table is to an empty entry.

43. The computer program product for performing the pattern range comparison of claim 35 further comprising program instructions that append the contents of a color register to the search key to provide a final search key.

44. The computer program product for performing the pattern range comparison of claim 35 further comprising program instructions that append a string of zeros to the search key to provide a final search key.

45. The computer program product for performing the pattern range comparison of claim 35 further comprising program instructions that perform a compare under range operations in which the bits in the search key are treated as an integer that is checked to determine if it is in a range defined by the pair of patterns.

46. The computer program product for performing the pattern range comparison of claim 35 further comprising program instructions that perform a compare under mask operation in which the bits in the search key are compared with the bits in a first leaf position under a mask specified in a second leaf pattern.

47. The computer program product for performing the pattern range comparison of claim 35 further comprising:
   program instructions that read a pair of patterns stored in another leaf and compare the patterns with the search key if the leaf contains a chain pointer to another leaf; and
   program instructions that return an indication of no success if the patterns stored do not include the search key and do not contain a pointer to a next leaf in the chain.

48. The computer program product for performing the pattern range comparison of claim 35 further comprising:
   program instructions that read a pair of patterns stored in another leaf and compare the patterns with the search key if the leaf contains a chain pointer to another leaf; and
   program instructions that return an indication of success if the patterns stored include the search key.

* * * * *